United States Patent
Kelch

(10) Patent No.: US 11,680,131 B2
(45) Date of Patent: Jun. 20, 2023

(54) TWO-COMPONENT POLYURETHANE COMPOSITION

(71) Applicant: SIKA TECHNOLOGY AG, Baar (CH)

(72) Inventor: Steffen Kelch, Oberengstringen (CH)

(73) Assignee: SIKA TECHNOLOGY AG, Baar (CH)

(*) Notice: Subject to any disclaimer, the term of this patent is extended or adjusted under 35 U.S.C. 154(b) by 83 days.

(21) Appl. No.: 17/420,894

(22) PCT Filed: Mar. 16, 2020

(86) PCT No.: PCT/EP2020/057152
§ 371 (c)(1),
(2) Date: Jul. 6, 2021

(87) PCT Pub. No.: WO2020/187855
PCT Pub. Date: Sep. 24, 2020

(65) Prior Publication Data
US 2022/0064359 A1    Mar. 3, 2022

(30) Foreign Application Priority Data
Mar. 18, 2019  (EP) .................................. 19163531

(51) Int. Cl.
*C08G 18/65* (2006.01)
*C08G 18/69* (2006.01)
(Continued)

(52) U.S. Cl.
CPC ..... *C08G 18/3284* (2013.01); *C08G 18/4233* (2013.01); *C08G 18/4829* (2013.01);
(Continued)

(58) Field of Classification Search
CPC ............ C08G 18/3284; C08G 18/4233; C08G 18/6594; C08G 18/6648; C08G 18/698
See application file for complete search history.

(56) References Cited

U.S. PATENT DOCUMENTS

2008/0119629 A1* 5/2008 Ohwada ................. C09J 175/04
528/53
2016/0068724 A1* 3/2016 Roock .................. C09D 175/14
156/331.7

(Continued)

FOREIGN PATENT DOCUMENTS

EP        3415544 A1   12/2018
WO   WO-2014184257 A1 * 11/2014 ............. B32B 37/12

OTHER PUBLICATIONS

Jul. 7, 2020 International Search Report issued in International Patent Application No. PCT/EP2020/057152.
(Continued)

*Primary Examiner* — Michael L Leonard
(74) *Attorney, Agent, or Firm* — Oliff PLC

(57) ABSTRACT

A two-component polyurethane composition including a polyol component and a polyisocyanate component, wherein the polyol component comprises at least one polyester polyol A1 based on dimer fatty acids and/or dimer fatty alcohols having an OH number of 65-350 mg KOH/g, at least one polybutadiene polyol A2 and at least one alkoxylated alkylenediamine A3. The polyurethane composition has high strength and only a minor dependence of the mechanical properties, especially strength, on temperature, especially in the range from −40° C. to +100° C.

15 Claims, 2 Drawing Sheets

Figure 1:
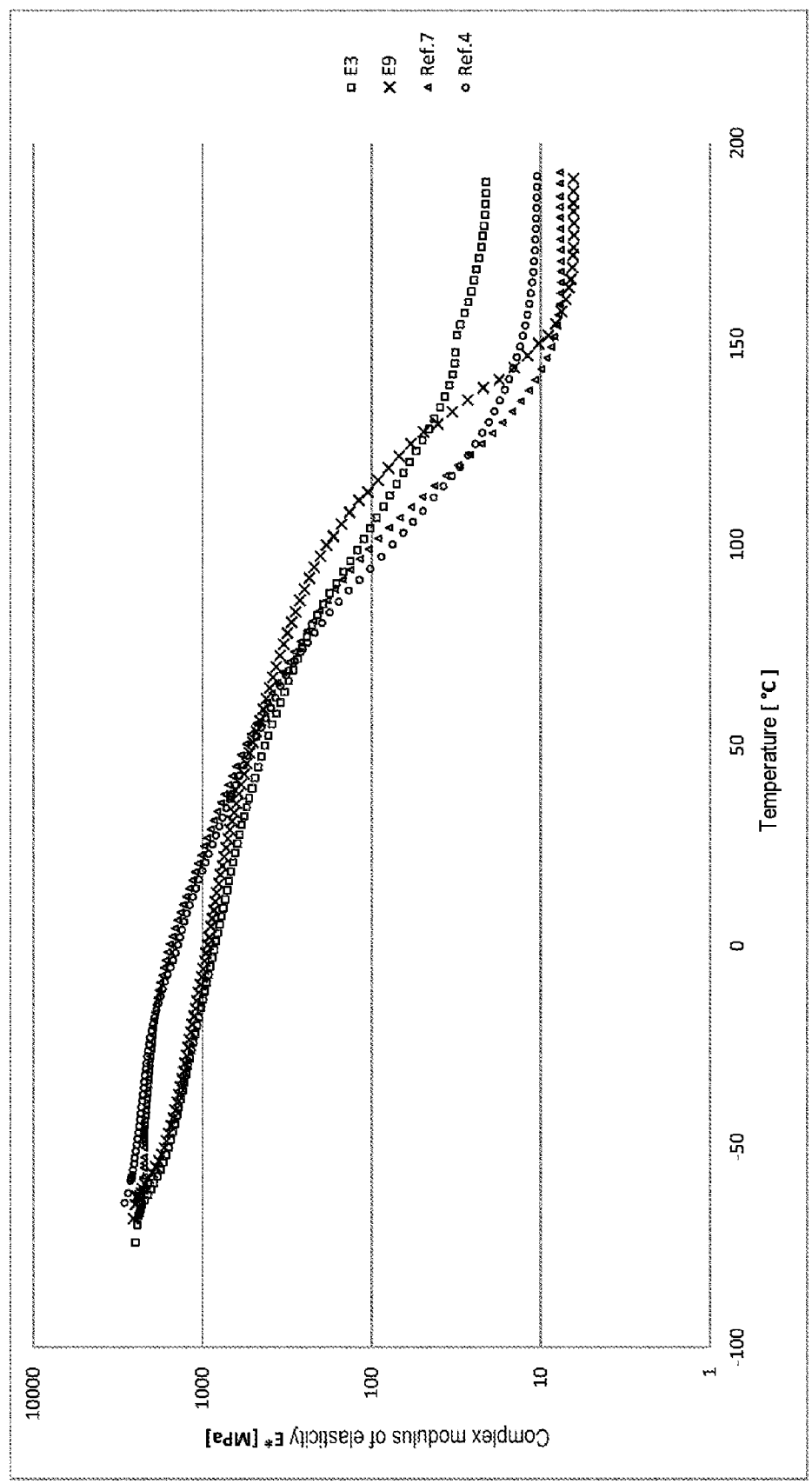

(51) Int. Cl.
    *C08G 18/42*    (2006.01)
    *C08G 18/32*    (2006.01)
    *C08G 18/48*    (2006.01)
    *C08G 18/66*    (2006.01)
    *C09J 175/06*   (2006.01)

(52) U.S. Cl.
    CPC ..... *C08G 18/6594* (2013.01); *C08G 18/6648* (2013.01); *C08G 18/698* (2013.01); *C09J 175/06* (2013.01); *C08G 2170/00* (2013.01); *C08G 2190/00* (2013.01)

(56) References Cited

U.S. PATENT DOCUMENTS

| | | | |
|---|---|---|---|
| 2016/0090515 A1* | 3/2016 | Roock | C08G 18/7671 156/331.7 |
| 2020/0017627 A1* | 1/2020 | Kelch | C04B 26/16 |
| 2020/0199286 A1* | 6/2020 | Kelch | C08G 18/3284 |

OTHER PUBLICATIONS

Jul. 7, 2020 Written Opinion issued in International Patent Application No. PCT/EP2020/057152.

Sep. 16, 2021 International Preliminary Report on Patentability issued in International Patent Application No. PCT/EP2020/057152.

* cited by examiner

TWO-COMPONENT POLYURETHANE COMPOSITION

TECHNICAL FIELD

The invention relates to the field of two-component polyurethane compositions and the use thereof, especially as adhesive, sealing compound or infusion resin.

STATE OF THE ART

Two-component polyurethane adhesives based on polyols and polyisocyanates have already been used for some time. Two-component polyurethane adhesives have the advantage that they cure rapidly after mixing and can therefore absorb and transmit higher forces even after a short time. For use as structural adhesives, high demands are made in relation to strength, since such adhesives are elements of load-bearing structures. For use as sealing compounds or infusion resins as well, high demands are made in respect of strength and processability.

There is a particular desire for adhesives, sealing compounds and infusion resins that have/assure high strengths for the purposes of structural bonds over a maximum temperature range, especially in the range from −40° C. to more than +100° C., combined with a minor dependence of strength on temperature. What are also desired are adhesives, or sealing compounds or infusion resins, that cure without a foaming reaction under ambient conditions and have good adhesion, especially to fiber-reinforced plastics, over a broad temperature range.

SUMMARY OF THE INVENTION

It is therefore an object of the present invention to provide a two-component polyurethane composition that has high strength and only a minor dependence of mechanical properties, especially strength, on temperature, especially in the range from −40° C. to +100° C. Moreover, the composition is to cure under ambient conditions without formation of foam on the basis of a reaction of isocyanate groups with moisture, even in the case of substrates that typically promote foaming reactions on account of available residual moisture, and have good adhesion, especially to fiber-reinforced plastics, over a broad temperature range.

This object is surprisingly achieved by the two-component polyurethane composition of the invention. The composition has high tensile strength and high moduli of elasticity with only a minor dependence of mechanical properties, especially tensile strength and moduli of elasticity, on temperature.

Moreover, the composition is particularly insensitive to foaming reactions triggered by air humidity or remaining residual moisture in the polyol component and/or the substrates. Furthermore, the composition shows good adhesion to carbon fiber-reinforced plastics (CFRP) over a broad temperature range.

Further aspects of the invention are the subject of further independent claims. Particularly preferred embodiments of the invention are the subject of the dependent claims.

Ways of Executing the Invention

The present invention relates to a two-component polyurethane composition consisting of a polyol component K1 and a polyisocyanate component K2;

wherein the polyol component K1 comprises
at least one polyester polyol A1 based on dimer fatty acids and/or dimer fatty alcohols having an OH number of 65-350 mg KOH/g; and
at least one polybutadiene polyol having an OH functionality in the range of 2.1-2.9, especially 2.3-2.7, and an OH number of 40-100 mg KOH/g A2; and
at least one alkoxylated alkylenediamine having an OH number of 350-950 mg KOH/g A3;
and wherein the polyisocyanate component K2 comprises
at least one aromatic polyisocyanate B1.

The ratio of the OH groups of A1/A2 is 1-20.

The prefix "poly" in substance names such as "polyol", "polyisocyanate", "polyether" or "polyamine" in the present document indicates that the respective substance formally contains more than one of the functional group that occurs in its name per molecule.

In the present document, "molecular weight" is understood to mean the molar mass (in grams per mole) of a molecule. "Average molecular weight" refers to the number-average molecular weight $M_n$ of a polydisperse mixture of oligomeric or polymeric molecules, which is typically determined by means of GPC against polystyrene as standard.

A "primary hydroxyl group" refers to an OH group bonded to a carbon atom having two hydrogens.

"Open time" in this document refers to the time within which the parts to be bonded have to be joined after the components have been mixed.

The term "strength" in the present document refers to the strength of the cured adhesive, and strength especially means the tensile strength and modulus of elasticity, especially within the expansion range of 0.05% to 0.25%.

In the present document, "room temperature" refers to a temperature of 23° C.

In the present document, glass transition temperature (also abbreviated hereinafter to Tg) is determined by the method as described in the examples section.

Preferably, in the present application, the OH number (hydroxyl number) is determined by titrimetry, especially by acetylation with acetic anhydride and subsequent titration of the excess acetic anhydride with alcoholic potassium hydroxide solution, more preferably according to DIN 53240.

The polyol component K1 comprises:
at least one polyester polyol A1 based on dimer fatty acids and/or dimer fatty alcohols having an OH number of 65-350 mg KOH/g.

Preferably, the at least one polyester polyol A1 is a polyester polyol A1 based on dimer fatty acids.

The at least one polyester polyol A1 is preferably a polyester polyol A1 based on dimer fatty acids derived from $C_{10}$-$C_{26}$ fatty acids, more preferably $C_{12}$-$C_{22}$ fatty acids, especially $C_{14}$-$C_{22}$ fatty acids, $C_{16}$-$C_{20}$ fatty acids, most preferably $C_{18}$ fatty acids.

The at least one polyester polyol A1 is preferably a polyester polyol A1 based on dimer fatty acids selected from the list consisting of dimerization products of fatty acids selected from the list consisting of oleic acid, linoleic acid, linolenic acid, palmitoleic acid and elaidic acid.

The dimerization products of the unsaturated fatty acid mixtures that are obtained in the hydrolysis of natural fats and oils, for example sunflower oil, soya oil, olive oil, rapeseed oil, cottonseed oil and tall oil, may likewise be used. In addition to the dimer fatty acids, the dimerization typically has the effect that there are varying amounts of oligomeric fatty acids (called "trimers") and residues of monomeric fatty acids (called "monomers") or esters thereof. Suitable dimer fatty acids have a dimer acid content of more than 60%, preferably more than 75%, more preferably in the range from 90% to 99.5%, especially 95% to 99% and especially 97% to 99%.

Suitable commercially available polyester polyols A1 include amorphous materials, preferably materials that are liquid at room temperature; available materials are, for example, Dynacoll® 7360, 7380, 7330, 7231, 7250 (Evonik), Rucoflex® S-105-10 (Bayer), Stepanpol® PN110 (Stepan), Priplast® 1838, 3196 (Croda PLC, UK).

The polyester polyol A1 preferably has an average molecular weight in the range from 500 to 1800 g/mol, 600 to 1600 g/mol, 700 to 1500 g/mol, especially 800 to 1200 g/mol.

The polyester polyol A1 preferably has an OH number of 75-300, especially 85-250, 85-200, 90-180, 90-150, especially preferably 100-130, mg KOH/g. If the polyester polyol A1 has an OH number of less than 65 mg KOH/g, this is disadvantageous in that this gives significantly lower values for tensile strength and moduli of elasticity. This is apparent, for example, in table 1 from the comparison of Ref.2 with E1 or E3-4.

Furthermore, an OH number of less than 65 mg KOH/g is disadvantageous in that this gives significantly lower values for lap shear strength. This is apparent, for example, from the comparison of Ref.2 with E1 in table 7.

The at least one polyester polyol A1 is preferably a diol.

The polyol component K1 comprises at least one polybutadiene polyol having an OH functionality in the range of 2.1-2.9, especially 2.3-2.7, and an OH number of 40-100 mg KOH/g A2.

Such polybutadiene polyols are especially obtainable by the polymerization of 1,3-butadiene and allyl alcohol in a suitable ratio or by the oxidation of suitable polybutadienes.

Suitable polybutadiene polyols are especially polybutadiene polyols that contain structural elements of the formula (I) and optionally structural elements of the formulae (II) and (III).

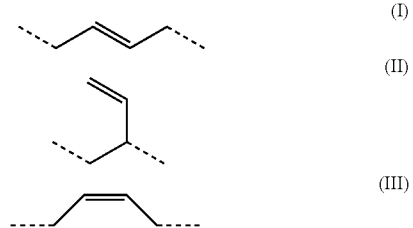

Preferred polybutadiene polyols contain 40% to 80%, especially 55% to 65%, of the structural element of the formula (I), 0% to 30%, especially 15% to 25%, of the structural element of the formula (II), 0% to 30%, especially 15% to 25%, of the structural element of the formula (III).

Particularly suitable polybutadiene polyols are available, for example, from Cray Valley under the Poly bd™ R-45HTLO or Poly bd™ R-45M trade name or from Evonik under the Polyvest HT trade name.

The presence of the at least one polybutadiene polyol A2 in the polyol component K1 is advantageous in that this achieves a greater difference between the first glass transition temperature (Tg1) and the second glass transition temperature (Tg2). In addition, higher values are obtained for the second glass transition temperature (Tg2).

The presence of the at least one polybutadiene polyol A2 in the polyol component K1 is further advantageous in that this gives higher values for lap shear strength, both at room temperature and at 80° C. This is apparent, for example, in table 7 from the comparison of Ref.7 with E9, Ref.31 with E21, Ref.4 with E3 and Ref.28 with E15.

If the aromatic polyisocyanate is an aromatic polyisocyanate B1-2, this additionally gives a lower temperature for the first glass transition temperature (Tg1).

This is apparent, for example, from the comparison of Ref.3 with E1, Ref.4 with E2, Ref.6 with E7, Ref.7 with E8, Ref.27 with E13, Ref.28 with E14, Ref.30 with E19, Ref.31 with E20.

The polyol component K1 comprises at least one alkoxylated alkylenediamine having an OH number of 350-950 mg KOH/g A3. The alkoxylated alkylenediamine A3 preferably has an OH number of 500-900, especially 700-800, especially 750-780, mg KOH/g.

Preferably, alkylenediamines having 2-6 carbon atoms, especially 2-3 carbon atoms, are more preferably ethylenediamine. The alkoxylated alkylenediamines are preferably prepared using ethylene oxide and/or 1,2-propylene oxide.

Alkoxylated alkylenediamines are preferably selected from the list consisting of N,N,N',N'-tetrakis(2-hydroxyethyl)ethylenediamine and N,N,N',N'-tetrakis(2-hydroxypropyl)ethylenediamine. Particular preference is given to N,N,N',N'-tetrakis(2-hydroxypropyl)ethylenediamine.

N,N,N',N'-Tetrakis(2-hydroxypropyl)ethylenediamine is obtainable, for example, as Quadrol® L from BASF SE, Germany.

The presence of the at least one alkoxylated alkylenediamine A3 in the polyol component K1 is advantageous in that this gives significantly shorter open times. Moreover, this achieves a greater difference between the first glass transition temperature (Tg1) and the second glass transition temperature (Tg2). In addition, higher values are obtained for the second glass transition temperature (Tg2).

The presence of the at least one alkoxylated alkylenediamine A3 in the polyol component K1 is further advantageous in that this gives higher values of lap shear strength. This is apparent, for example, in table 7 from the comparison of Ref.22 with E9 and Ref.13 with E15.

If the aromatic polyisocyanate is an aromatic polyisocyanate B1-1, this additionally gives higher values for tensile strength and moduli of elasticity.

This is apparent, for example, from the comparison of table 1 with table 3, or table 2 with table 4.

The polyol component K1 preferably comprises at least one aliphatic triol
A4, where the aliphatic triol A4 is:
propane-1,2,3-triol and/or
1,1,1-trimethylolpropane and/or
polyether polyols based on 1,1,1-trimethylolpropane having a molecular weight of 170-500 g/mol.

Suitable propane-1,2,3-triols (also called glycerol) are commercially available from ecoMotion GmbH, Germany.

Suitable 1,1,1-trimethylolpropanes (also called trimethylolpropane or 2-(hydroxymethyl)-2-ethylpropane-1,3-diol) are also commercially available, for example, from Perstorp AB, Sweden.

The aliphatic triol A4 preferably comprises polyether polyols based on 1,1,1-trimethylolpropane having a molecular weight of 170-500 g/mol, especially 175-400 g/mol, preferably of 175-350 g/mol.

Preferably, the polyether polyols based on 1,1,1-trimethylolpropane are alkoxylated 1,1,1-trimethylolpropane, especially ethoxylated or propoxylated 1,1,1-trimethylolpropane, most preferably propoxylated 1,1,1-trimethylolpropane.

Suitable polyether polyols based on 1,1,1-trimethylolpropane are also commercially available, for example, under the Desmophen® 4011 T trade name from Bayer MaterialScience, Germany or under the Lupranol® 3903 trade name from BASF, Germany.

If the polyol component K1 additionally includes at least one aliphatic triol A4, this is advantageous in that this gives significantly longer open times and gives higher values for elongation at break. This is advantageous especially for large-area repairs or large substrate areas.

This is apparent, for example, from the comparison of table 1 with table 5, or table 2 with table 6.

The ratio of the OH groups of A1/A2 is 1-20. The ratio described above is understood to mean the molar ratio of the groups mentioned.

If the ratio is less than 1, this is disadvantageous in that this gives short open times and low values for tensile strength and moduli of elasticity.

This is apparent, for example, from the comparison of Ref.5 with E2-6, Ref.8 with E8-12, Ref.29 with E14-18, or Ref.32 with E20-24.

Furthermore, a ratio of less than 1 is disadvantageous in that this gives significantly lower values for lap shear strength. This is apparent, for example, from the comparison of Ref.5 with E3 in table 7.

If the ratio is more than 20, this is disadvantageous in that this achieves a smaller difference between the first glass transition temperature (Tg1) and the second glass transition temperature (Tg2). In addition, lower values are obtained for the second glass transition temperature (Tg2).

This is apparent, for example, from the comparison of Ref.3 with E1, Ref.4 with E2, Ref.6 with E7, Ref.7 with E8, Ref.27 with E13, Ref.28 with E14, Ref.30 with E19, Ref.31 with E20.

Furthermore, a ratio of more than 20 is disadvantageous in that this gives lower values for lap shear strength. This is apparent, for example, from the comparison of Ref.4 with E3 in table 7.

The ratio is preferably 1-18, 1-15, 1-10, 1-8, especially 1.5-7, 2-7, 2.5-6.5, more preferably 3-6. This is advantageous in that this gives a balanced ratio of open time and high values for tensile strength and moduli of elasticity, with simultaneously high values for the temperature difference between the first glass transition temperature (Tg1) and the second glass transition temperature (Tg2).

The ratio of the OH groups of (A1/A3) is preferably 0.15-0.5, especially 0.2-0.45, 0.25-0.45, more preferably 0.3-0.4. The ratio described above is understood to mean the molar ratio of the groups mentioned.

It is further preferable when the ratio of the OH groups of (A1+A2)/A4 is 0.75-1.2, especially 0.8-1.1, 0.85-1.05, more preferably 0.9-1.05. The ratio described above is understood to mean the molar ratio of the groups mentioned.

It is further preferable when the ratio of the OH groups of A3/A4 is 0.3-3.3, especially 0.5-3.0, 0.6-2.5, 0.7-2.0, 0.8-1.5, more preferably 0.8-1.2. The ratio described above is understood to mean the molar ratio of the groups mentioned.

It is further preferable when the ratio of the OH groups of (A1+A2)/(A3+optionally A4) is 0.6. This is advantageous in that this achieves a greater difference between the first glass transition temperature (Tg1) and the second glass transition temperature (Tg2). Furthermore, higher values are obtained for the second glass transition temperature (Tg2). The ratio described above is understood to mean the molar ratio of the groups mentioned. This is apparent, for example, from the comparison of E1 with E2-6, E7 with E8-12, E13 with E14-18, or E19 with E20-24.

If the aromatic polyisocyanate is an aromatic polyisocyanate B1-1, this additionally gives a lower temperature for the first glass transition temperature (Tg1). This is apparent, for example, from the comparison of E1 with E2-6, or E13 with E14-18.

The present polyisocyanate component K2 comprises at least one aromatic polyisocyanate B1.

Suitable aromatic polyisocyanates B1 are especially monomeric di- or triisocyanates, and oligomers, polymers and derivatives of monomeric di- or triisocyanates, and any mixtures thereof.

Suitable aromatic monomeric di- or triisocyanates are especially tolylene 2,4- and 2,6-diisocyanate and any mixtures of these isomers (TDI), diphenylmethane 4,4'-, 2,4'- and 2,2'-diisocyanate and any mixtures of these isomers (MDI), phenylene 1,3- and 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris(4-isocyanatophenyl) thiophosphate. Preferred aromatic monomeric di- or triisocyanates are derived from MDI and/or TDI, especially from MDI.

Suitable oligomers, polymers and derivatives of the monomeric di- and triisocyanates mentioned are especially derived from MDI and TDI. Especially suitable among these are commercially available grades, TDI oligomers such as Desmodur® IL (from Bayer); also suitable are room temperature liquid forms of MDI (called "modified MDI"), which are mixtures of MDI with MDI derivatives, such as, in particular, MDI carbodiimides or MDI uretonimines, known by trade names such as Desmodur® CD, Desmodur® PF, Desmodur® PC (all from Bayer), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). The aforementioned oligomeric polyisocyanates of this kind are typically mixtures of substances having different degrees of oligomerization and/or chemical structures. They preferably have an average NCO functionality of 2.1 to 4.0, preferably 2.1 to 3.0, especially 2.1 to 2.6. Preferred aromatic polyisocyanates B1 are monomeric MDI or oligomers, polymers and derivatives derived from MDI, especially having an average NCO functionality of 2.0-4.0, preferably 2.0-3.0, especially 2.1-2.6.

These are particularly advantageously oligomers, polymers and derivatives derived from MDI, especially polymers derived from MDI, especially having an average NCO functionality of 2.1-2.6.

If they are oligomers, polymers and derivatives derived from MDI having an average NCO functionality of 2.4-2.6, this can be advantageous in that this gives particularly high values for the temperature difference between the first and second Tg. This is apparent, for example, in the comparison of table 1 with table 3.

If they are oligomers, polymers and derivatives derived from MDI having an average NCO functionality of 2.1-2.3, this can be advantageous in that this gives higher values for the moduli of elasticity. This is apparent, for example, from the comparison of table 1 with table 2, or table 5 with table 6.

They are especially polymers derived from MDI, especially having a proportion by weight of polymers derived from MDI of 20-90% by weight, based on the total weight of the aromatic polyisocyanate B1.

It is further advantageous when the aromatic polyisocyanate B1 has an average molecular weight of 160-2000 g/mol, especially 500-1500 g/mol.

It is further advantageous when the sum total of the NCO groups that do not originate from B1 is ≤5%, especially ≤2%, especially preferably ≤1%, most preferably ≤0.5%, based on the sum total of all NCO groups of the two-component polyurethane composition.

Preferably, the proportion of the aromatic polyisocyanate B1 is ≥90% by weight, especially ≥95% by weight, especially preferably ≥99% by weight, based on the total weight of the polyisocyanate component K2.

Preferably, the ratio of all NCO groups of the aromatic polyisocyanates B1:all OH groups of the polyol component K1=0.9:1-1.2:1, especially 1.0:1-1.1:1.

Preferably, the ratio of all NCO groups of the aromatic polyisocyanates B1:all OH groups of the sum total of (A1+A2+A3+optionally A4)=0.9:1-1.2:1, especially 1.0:1-1.1:1.

The ratios described above are understood to mean the molar ratio of the groups mentioned.

It may be further preferable when, in the two-component polyurethane composition, the sum total of all OH groups of (A1+A2+A3+optionally A4) is ≥60%, ≥70%, especially ≥80%, especially preferably ≥90%, ≥95%, most preferably ≥98%, ≥99%, of the sum total of all OH groups of the two-component polyurethane composition.

Preferably, the two-component polyurethane composition is essentially free of OH groups that do not originate from (A1+A2+A3+optionally A4). The expression "essentially free" is understood in this case to mean that the sum total of the OH groups that do not originate from (A1+A2+A3+ optionally A4) is ≤15%, especially ≤10%, especially preferably ≤5%, most preferably ≤2%, based on the sum total of all OH groups of the two-component polyurethane composition.

In addition, the two-component polyurethane composition may contain catalysts that accelerate the reaction of hydroxyl groups with isocyanate groups, especially organotin, organozinc, organozirconium and organobismuth metal catalysts, for example dibutyltin dilaurate, or tertiary amines, amidines or guanidines, for example 1,4-diazabicyclo[2.2.2]octane (DABCO) or 1,8-diazabicyclo[5.4.0]undec-7-ene (DBU). To achieve thermal activation, particularly the tertiary amines, amidines or guanidines can reversibly form a salt or a complex with phenol or carboxylic acids, especially phenolic or other aromatic carboxylic acids, which is broken down when the temperature is increased.

The two-component polyurethane composition preferably includes 0% to 2% by weight, especially preferably 0% to 0.5% by weight, less than 0.2% by weight, more preferably less than 0.1% by weight and most preferably none of the aforementioned catalysts for the acceleration of the reaction of hydroxyl groups with isocyanate groups.

Preferred further constituents are inorganic or organic fillers, such as, in particular, natural, ground or precipitated calcium carbonates, optionally coated with fatty acids, especially stearic acid, baryte (heavy spar), talcs, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum or steel, PVC powder or hollow spheres.

The addition of fillers, especially when the polyurethane composition is an adhesive, is advantageous in that this increases the strength of the cured polyurethane composition.

It may be advantageous when the polyurethane composition comprises at least one filler selected from the group consisting of calcium carbonate, kaolin, baryte, talc, dolomite, wollastonite, kaolin, calcined kaolin and mica.

Further constituents present may especially also be solvents, plasticizers and/or chain extenders, pigments, rheology modifiers such as, in particular, amorphous hydrophobic silicas, desiccants such as, in particular, zeolites, adhesion promoters such as, in particular, trialkoxysilanes, stabilizers against oxidation, heat, light and UV radiation, flame-retardant substances, and surface-active substances, especially wetting agents and defoamers.

Components K1 and K2 are advantageously formulated such that the volume ratio of components K1 and K2 is between 1:3 and 3:1, especially between 1:2 and 2:1. This ratio is more preferably about 1:1.

A preferred two-component polyurethane composition consists of: a polyol component K1 containing, especially consisting of:
- 70% to 95% by weight, preferably 80% to 95% by weight, especially 85% to 95% by weight, of the sum total of (A1+A2+A3+optionally A4); and
- 5% to 30% by weight, preferably 5% to 20% by weight, especially 5% to 10% by weight, of fillers, especially fillers selected from the group consisting of calcium carbonate, kaolin, baryte, talc, dolomite, wollastonite, kaolin, calcined kaolin, and mica, more preferably calcium carbonate and rheology modifiers such as, in particular, hydrophobic amorphous silicas; and
- 0% to 5% by weight, preferably 1% to 3% by weight, of desiccants (especially zeolites);

based on the total weight of the polyol component K1, and of a polyisocyanate component K2 including:
- a proportion of the aromatic polyisocyanate B1 of ≥90% by weight, especially ≥95% by weight, especially preferably ≥99% by weight, based on the total weight of the polyisocyanate component K2.

Such a composition is especially suitable as a sealing compound.

A further preferred two-component polyurethane composition consists of a polyol component K1 containing, especially consisting of:
- 30% to 70% by weight, preferably 40% to 60% by weight, especially 45% to 55% by weight, of the sum total of (A1+A2+A3+optionally A4); and
- 20% to 60% by weight, preferably 30% to 50% by weight, especially 35% to 45% by weight, of fillers, especially fillers selected from the group consisting of calcium carbonate, kaolin, baryte, talc, dolomite, wollastonite, kaolin, calcined kaolin, and mica, more preferably calcium carbonate and rheology modifiers such as, in particular, hydrophobic amorphous silicas; and
- 0% to 5% by weight, preferably 0.5% to 3% by weight, especially preferably 1% to 2% by weight, of desiccants (especially zeolites);

based on the total weight of the polyol component K1, and of a polyisocyanate component K2 including:
- a proportion of the aromatic polyisocyanate B1 of ≥90% by weight, especially ≥95% by weight, especially preferably ≥99% by weight, based on the total weight of the polyisocyanate component K2.

Such a composition is especially suitable as an adhesive.
A further preferred two-component polyurethane composition consists of a polyol component K1 containing, especially consisting of:
90% to 100% by weight, preferably 95% to 97% by weight, of the sum total of (A1+A2+A3+optionally A4); and
0% to 5% by weight, preferably 0% to 2% by weight, especially 0% to 0.5% by weight, more preferably less than 0.1 percent by weight, of fillers, most preferably no fillers, especially fillers selected from the group consisting of calcium carbonate, kaolin, baryte, talc, dolomite, wollastonite, kaolin, calcined kaolin, and mica, more preferably calcium carbonate and rheology modifiers such as, in particular, hydrophobic amorphous silicas; and
0% to 5% by weight, preferably 0.5% to 3% by weight, especially preferably 1% to 2% by weight, of desiccants (especially zeolites);
based on the total weight of the polyol component K1, and of a polyisocyanate component K2 including:
a proportion of the aromatic polyisocyanate B1 of ≥90% by weight, especially ≥95% by weight, especially preferably ≥99% by weight, based on the total weight of the polyisocyanate component K2.

Such a composition is especially suitable as an infusion resin.

The two components are produced separately from one another and, at least for the second component, preferably with exclusion of moisture. The two components are typically each stored in a separate container. The further constituents of the polyurethane composition may be present as a constituent of the first or second component, with further constituents that are reactive toward isocyanate groups preferably being a constituent of the first component. A suitable container for storage of the respective component is especially a vat, a hobbock, a bag, a bucket, a can, a cartridge or a tube. The components are both storage-stable, meaning that they can be stored prior to use for several months up to one year or longer, without any change in their respective properties to a degree relevant to their use.

The two components are stored separately from one another prior to the mixing of the composition and are only mixed with one another on or immediately prior to use. They are advantageously present in a package consisting of two separate chambers.

In a further aspect, the invention comprises a pack consisting of a package having two separate chambers which respectively contain the first component and the second component of the composition.

The mixing is typically effected via static mixers or with the aid of dynamic mixers. In the mixing, it should be ensured that the two components are mixed with maximum homogeneity. If the two components are mixed incompletely, local deviations from the advantageous mixing ratio will occur, which can result in a deterioration in the mechanical properties.

On contact of the first component with isocyanate groups of the second component, curing commences by chemical reaction. This involves reaction of the hydroxyl groups present and of any further substances reactive toward isocyanate groups that are present with isocyanate groups that are present. Excess isocyanate groups react with moisture present. As a result of these reactions, the polyurethane composition cures to give a solid material. This process is also referred to as crosslinking.

The invention thus also further provides a cured polyurethane composition obtained from the curing of the polyurethane composition as described in the present document.

The two-component polyurethane composition described is advantageously usable as structural adhesive, as sealing compound or as infusion resin.

The invention thus also relates to a method of bonding a first substrate to a second substrate, comprising the steps of:
mixing the above-described polyol component K1 and polyisocyanate component K2,
applying the mixed polyurethane composition to at least one of the substrate surfaces to be bonded,
joining the substrates to be bonded within the open time,
curing the polyurethane composition.

These two substrates may consist of the same material or different materials.

The invention thus also further relates to a method of filling joins and gaps between two substrates, comprising the steps of:
mixing the above-described polyol component K1 and polyisocyanate component K2,
applying the mixed polyurethane composition to the join or gap,
curing the polyurethane composition.

In these methods of bonding and of filling joins and cracks, suitable substrates are especially
glass, glass ceramic, glass mineral fiber mats, glass fiber weave;
metals and alloys such as aluminum, iron, steel and nonferrous metals, and also surface-finished metals and alloys such as galvanized or chromed metals;
coated and painted substrates, such as powder-coated metals or alloys and painted sheet metal;
plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, in particular epoxy-based thermosets, polyurethanes (PUR), polyoxymethylene (POM), polyolefins (PO), polyethylene (PE) or polypropylene (PP), ethylene/propylene copolymers (EPM), and ethylene/propylene/diene terpolymers (EPDM), wherein the plastics may preferably have been surface-treated by means of plasma, corona or flame treatment;
fiber-reinforced plastics, such as carbon fiber-reinforced plastics (CFP), glass fiber-reinforced plastics (GFP) and sheet molding compounds (SMC);
wood, woodbase materials bonded with resins, for example phenolic, melamine or epoxy resins, resin-textile composites and further polymer composites; and
concrete, mortar, brick, gypsum and natural stone such as granite, limestone, sandstone or marble.

In these processes, one or both substrates is preferably a metal or a glass ceramic or a glass or a glass fiber-reinforced plastic or a carbon fiber-reinforced plastic or an epoxy-based thermoset.

The substrates can be pretreated if required prior to the application of the composition. Such pretreatments include, in particular, physical and/or chemical cleaning processes and the application of an adhesion promoter, an adhesion promoter solution or a primer.

The bonding process described gives rise to an article in which the composition joins two substrates to one another.

This article is in particular a sandwich element of a lightweight structure, a built structure, for example a bridge, an industrial product or a consumer product, in particular a window, a rotor blade of a wind turbine or a mode of transport, in particular a vehicle, preferably an automobile, a bus, a truck, a rail vehicle or a ship, or else an aircraft or a helicopter, or an installable component of such an article.

One feature of the two-component polyurethane composition described is that it has a minor dependence of mechanical properties, especially tensile strength and moduli of elasticity, on temperature. On account of these properties, it is very particularly suitable as structural adhesive for bonds that are subject to stress outdoors at ambient temperatures.

The invention thus also further provides for the use of the described polyurethane composition as structural adhesive for bonding two substrates.

The polyurethane composition described is likewise advantageously usable as a sealing compound, in particular as a sealing compound for filling gaps and joins, for repair purposes, as a ballast compensation compound or as potting compound for the protection of electronic components.

The polyurethane composition is further preferably used as a sealing compound, in particular as an electrical potting compound. In a further aspect, the invention therefore encompasses the use of a two-component polyurethane composition as a sealing compound, in particular as an electrical potting compound.

Typical examples of applications of the polyurethane compositions of the invention can be found in the field of electrical potting compounds.

In a further aspect, the invention therefore encompasses a method of filling joins and gaps in a substrate, comprising the steps of
  a) mixing the polyol component (K1) and the polyisocyanate component (K2) of a two-component polyurethane composition as described above,
  b) applying the mixed polyurethane composition to the gap or join to be filled in the substrate,
  c) curing the polyurethane composition in the join or gap.

Particularly suitable substrates are metal, plastic, wood, glass, ceramic and fiber-reinforced plastics, especially metal and fiber-reinforced plastics.

In a further aspect, the invention therefore also encompasses a filled article that has been filled by the process described above.

The invention also further provides for the use of the polyurethane composition described as infusion resin, especially for production of fiber-reinforced composite parts, more preferably in infusion methods. For use as infusion resin, especially as infusion resin for composite parts, the two-component polyurethane composition (2K PU composition) preferably has a viscosity in mixed form of 500 to 5000 mPas (measured by Brookfield RTV, speed 10 rpm, cone/plate, CP 50/1), measured at a temperature of 20° C. The viscosity should especially be from 1000 to 2000 mPas, measured at 20° C. The viscosity should be determined immediately after mixing, for example up to 1 min after mixing; it increases steadily as a result of the onset of the crosslinking reaction.

Preference is given to using a two-component polyurethane composition having a relatively short open time. This should preferably be 2-30 min, especially 5-15 min. A measure that can be determined for open time is the "Gelation time [min]", using the time until occurrence of gelation as described in the examples below.

The invention also further provides a method of producing fiber-reinforced composite parts and an above-described two-component polyurethane composition, characterized in that the polyol component K1 and the polyisocyanate component K2 are mixed and then, especially within less than 5 min after mixing, preferably immediately after mixing, are introduced into a mold containing the fibers under reduced pressure and/or elevated pressure.

The mixing of the polyol component K1 with the polyisocyanate component K2 can be effected batchwise or continuously, preferably continuously.

It has been found that, surprisingly, the composition of the invention is particularly resistant to foaming as a result of the reaction of isocyanate with residual moisture remaining in the polyol component K1. All cured compositions of the invention in tables 1, 2, 5 and 6 had no blistering at all. Therefore, it is possible to dispense with drying, typically by means of reduced pressure, of the polyol component K1, which is a great advantage in terms of process technology. It may therefore be advantageous when no reduced pressure, especially of less than 200 mbar, especially of less than 100 mbar, especially of less than 50 mbar, preferably 20-5 mbar, is applied to the polyol component K1 for more than 10 min, especially more than 30 min, preferably for 30-120 min, within less than 1 day, preferably less than 5 h, prior to the mixing. It may further be advantageous when no reduced pressure, especially of less than 200 mbar, especially of less than 100 mbar, especially of less than 50 mbar, preferably 20-5 mbar, is applied to the mixture of the polyol component K1 and the polyisocyanate component K2 for more than 1 min, especially more than 10 min, preferably for 10-30 min prior to the introduction into the mold.

It has been found that, surprisingly, the compositions of the invention are particularly resistant to foaming as a result of a reaction of isocyanate groups with residual moisture remaining in the fiber material, especially glass fibers. Therefore, when the compositions of the invention are used, it is possible to dispense with drying of the fibers, especially by heating and/or reduced pressure, which is a great advantage in terms of process technology.

It may further be advantageous when the fibers are not dried, especially not dried by applying reduced pressure, especially of less than 100 mbar, especially less than 50 mbar, preferably 20-1 mbar, for more than 60 min, especially more than 120 min, preferably for 1-12 h, especially preferably 2-8 h, and/or heating to a temperature above 50° C., especially about 55° C., more preferably to a temperature of 60-80° C., for more than 60 min, preferably more than 120 min, especially preferably for 1-12 h, especially preferably 2-8 h, within less than 24 h, preferably less than 12 h, especially less than 6 h, prior to the introduction of the mixture of the polyol component K1 and the polyisocyanate component K2 into the mold containing the fibers.

Suitable fibers in the process of the invention are known high-strength fibers. Preferably, the fibers are selected from the group consisting of natural fibers, glass fibers, carbon fibers, polymer fibers, ceramic fibers and metal fibers, especially glass fibers and carbon fibers, more preferably glass fibers.

These fibers are preferably used in the form of mats, weaves and scrims, preferably as a weave, more preferably as a weave consisting of bundles of continuous fibers, especially continuous glass fibers.

The invention also further provides a fiber composite obtained from the method of the invention and a fiber composite consisting of fibers and an above-described cured two-component polyurethane composition. The fibers have preferably been embedded in the two-component polyurethane composition.

If the two-component polyurethane composition is used as adhesive or infusion resin, the cured composition preferably has the following properties (by the test methods/test conditions/curing conditions used in the examples section below):

| | |
|---|---|
| Tensile strength (TS) [MPa] | >7, >10, especially >12, >15, >18, >20 |
| Elongation at break (EB) [%] | 20-150, 30-120, 40-120, 50-120, especially 60-120 |
| Modulus of elasticity 0.05-0.25% [MPa] | 130-1000, 200-1000, 300-850, 350-750, especially 400-750 |
| Lap shear strength (LSS) at RT [MPa] | >8, >10, especially >12 |
| Lap shear strength (LSS) at 80° C. [MPa] | >3, >4, especially >5, >6 |
| 1st $T_g$ [° C.] | −30 to −65, especially −40 to −65, −45 to −65 |
| 2nd $T_g$ [° C.] | >65, >70, >80, >90, especially >100, >120, >140, >150, and preferably <200 |
| Gelation time (GT) [min] | >2, >3, especially >5, >10, >15 minutes, preferably <240, <120, <90, especially <60 minutes |
| Curing | No blistering on curing at a temperature between 0° C. and 80° C., especially at room temperature. |

EXAMPLES

| | Substances used: |
|---|---|
| A1 | Priplast ® 1837, room temperature liquid polyester diol based on dimer fatty acids of $C_{14}$-$C_{22}$ fatty acids, dimer acid content of more than 95%, average molecular weight about 1000 g/mol, OH number 110 mg KOH/g (Croda PLC, UK). |
| A1 Ref. | Priplast ® 1838, room temperature liquid polyester diol based on dimer fatty acids of $C_{14}$-$C_{22}$ fatty acids, dimer acid content of more than 95%, average molecular weight about 2000 g/mol, OH number 56 mg KOH/g (Croda PLC, UK). |
| A2 | Polybd 45 HTLO, polybutadiene polyol having primary OH groups, OH functionality 2.4-2.6, average molecular weight about 2800 g/mol, OH number 48 mg KOH/g (Total Cray Valley, USA) |
| A3 | Quadrol, N,N,N',N'-tetrakis(2-hydroxypropyl)ethylenediamine, OH number 770 mg KOH/g, Sigma Aldrich |
| A4 | Desmophen ® 4011 T, OH number of 550 ± 25 mg KOH/g, molecular weight of about 300 ± 20 g/mol, Bayer MaterialScience, Germany |
| Molecular sieve | Molecular sieve, zeolite (Sylosiv ® A3 from W. R. Grace & Co., USA) |
| B1-1 VL | Desmodur VL, polymeric MDI, aveage NCO functionality of 2.5, Desmodur ® VL, Covestro AG, Germany |
| B1-2 CD | Desmodur CD, modified diphenylmethane diisocyanate containing MDI-carbodiimide adducts, average NCO functionality of 2.2., NCO content 29.4% by weight, Isonate ® M 143 from Dow |

Production of Polyurethane Compositions

For each composition, the ingredients specified in tables 1-6 were processed in the specified amounts (in parts by weight) of the polyol component K1 by means of a vacuum dissolver with exclusion of moisture to give a homogeneous paste, and stored. The ingredients of the polyisocyanate component K2 specified in table 1 were likewise processed and stored. The two components were then processed by means of a SpeedMixer® (DAC 150 FV, Hauschild) for 30 seconds to give a homogeneous paste (ratio of all NCO groups B1:all OH groups of the polyol component K1=1.10 in each case), which was immediately tested as follows:

To determine the mechanical properties, the adhesive was converted to dumbbell form according to ISO 527, Part 2, 1B, and stored/cured under standard climatic conditions (23° C., 50% relative humidity) for 7 days. Thereafter, at room temperature, modulus of elasticity in the range from 0.05% to 0.25% elongation ("Modulus of elasticity 1", "Em 0.05-0.25%"), modulus of elasticity in the range from 0.5% to 5% elongation ("Modulus of elasticity 2", "Em 0.5-5%"), tensile strength (TS) and elongation at break (EB) of the test specimens thus produced were measured to ISO 527 on a Zwick Z020 tensile tester at a testing speed of 10 mm/min.

Glass transition temperature, abbreviated in the tables to $T_g$, was determined from DMTA measurements on strip samples (height 2-3 mm, width 2-3 mm, length 8.5 mm) which were stored/cured at 23° C. for 7 days, with a Mettler DMA/SDTA 861e instrument. The measurement conditions were: measurement in tensile mode, excitation frequency 10 Hz and heating rate 5 K/min. The samples were cooled down to −70° C. and heated to 200° C. with determination of the complex modulus of elasticity E* [MPa], and a maximum in the curve for the loss angle "tan δ" was read off as $T_g$.

The results are reported in tables 1-6.

Figure 2:
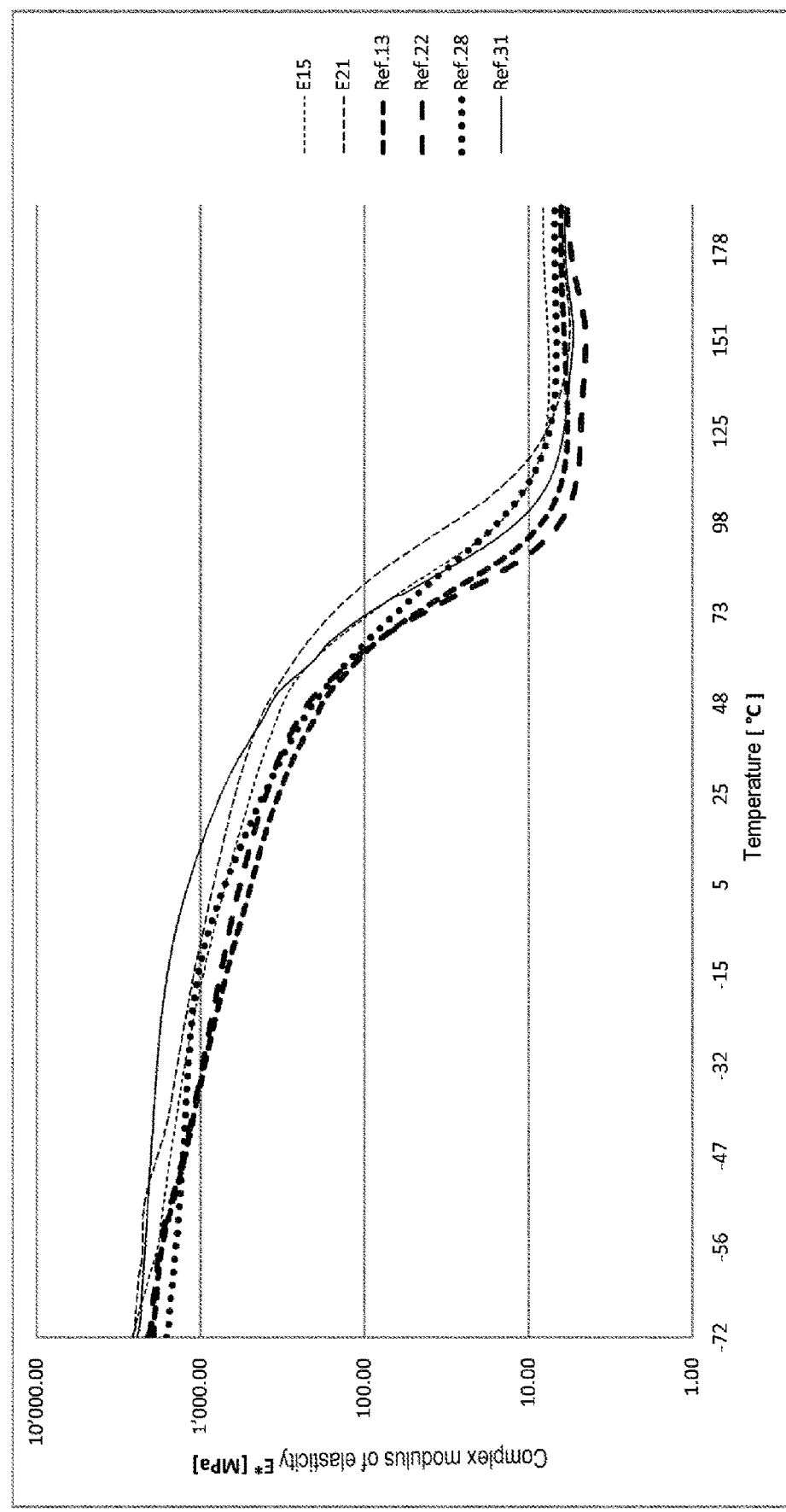

The progression of the modulus of elasticity (complex modulus of elasticity E* [MPa] as a function of temperature [° C.]) was reproduced in FIGS. 1 and 2 for the compositions identified.

Lap shear strength (LSS) was measured by producing test specimens with the compositions listed in table 7. The adhesive was applied 1 minute after the conclusion of the mixing time in each case between two heptane-degreased carbon fiber-reinforced composite test specimens (Sika Carbodur plates, Sika AG, Switzerland) in a layer thickness of 0.8 mm and over an overlapping bond area of 10×45 mm. The test specimens were stored/cured under standard climatic conditions for 7 days. Lap shear strength was determined to DIN EN 1465 at a strain rate of 10 mm/min at 23° C. (LSS RT), and at 80° C. (LSS 80° C.).

TABLE 1

| | Ref.1 | Ref.2 | Ref.3 | E1 | Ref.4 | E2 | E3 | E4 | E5 | E6 | Ref.5 |
|---|---|---|---|---|---|---|---|---|---|---|---|
| K1 | | | | | | | | | | | |
| A1 Ref. (OHN 56) | 20 | 15 | | | | | | | | | |
| A1 (OHN 110) | | | 20 | 15 | 19 | 14 | 12 | 10 | 8 | 6 | 5 |
| A2 (OHN 48) | | 5 | | 5 | | 5 | 7 | 9 | 11 | 13 | 14 |
| A3 (OHN 770) | 4 | 4 | 4 | 4 | 5 | 5 | 5 | 5 | 5 | 5 | 5 |
| A4 (OHN 550) | | | | | | | | | | | |
| Molecular sieve | 1 | 1 | 1 | 1 | 1 | 1 | 1 | 1 | 1 | 1 | 1 |

TABLE 1-continued

|  | Ref.1 | Ref.2 | Ref.3 | E1 | Ref.4 | E2 | E3 | E4 | E5 | E6 | Ref.5 |
|---|---|---|---|---|---|---|---|---|---|---|---|
| K2 | | | | | | | | | | | |
| B1-1 VL | 11.00 | 10.90 | 13.80 | 13.00 | 15.53 | 14.72 | 14.39 | 14.08 | 13.75 | 13.42 | 13.26 |
| B1-2 CD | | | | | | | | | | | |
| GT [min] | 6' | 7' | 5' | 4' | 2' | 2' | 2' | 2' | 2' | 1' | 2' |
| 1st TG [° C.] | −20 | −27 | 17 | −50 | 1 | −50 | −58 | −53 | −60 | −48 | −46 |
| 2nd TG [° C.] | 165 | 165 | 103 | 120 | 111 | 130 | 136 | 148 | 157 | 175 | 188 |
| TS [MPa] | 11.6 | 9.58 | 17.7 | 16.3 | 22 | 20.2 | 20.7 | 18.6 | 15.5 | 7.68 | 5.03 |
| EB [%] | 66.9 | 67.6 | 58 | 61 | 60.3 | 68.4 | 75.3 | 53.7 | 28.5 | 19.8 | 36.1 |
| Mod. E. 1 [MPa] | 38.8 | 24.1 | 377 | 419 | 615 | 573 | 634 | 613 | 645 | 176 | 31.1 |
| Mod. E. 2 [MPa] | 26.51 | 17.7 | 191 | 194 | 300.27 | 262.87 | 275.12 | 279.97 | 247.01 | 86.11 | 21.14 |
| A1/(A2 + A3 + A4) | 0.36 | 0.25 | 0.71 | 0.50 | 0.54 | 0.38 | 0.32 | 0.26 | 0.20 | 0.15 | 0.12 |
| (A1 + A2)/(A3 + A4) | 0.36 | 0.35 | 0.71 | 0.61 | 0.54 | 0.46 | 0.43 | 0.40 | 0.37 | 0.33 | 0.32 |
| (A1 + A2)/(A3) | 0.36 | 0.35 | 0.71 | 0.61 | 0.54 | 0.46 | 0.43 | 0.40 | 0.37 | 0.33 | 0.32 |
| (A1 + A2)/(A4) | — | — | — | — | — | — | — | — | — | — | — |
| A1/A2 | — | 3.5 | — | 6.88 | — | 6.42 | 3.93 | 2.55 | 1.67 | 1.06 | 0.82 |
| A1/A3 | 0.36 | 0.27 | 0.71 | 0.54 | 0.54 | 0.40 | 0.34 | 0.29 | 0.23 | 0.17 | 0.14 |
| Diff.Tg1 + Tg2 | 185 | 192 | 103 | 170 | 111 | 180 | 194 | 201 | 217 | 223 | 234 |

TABLE 2

|  | Ref.6 | E7 | Ref.7 | E8 | E9 | E10 | E11 | E12 | Ref.8 |
|---|---|---|---|---|---|---|---|---|---|
| K1 | | | | | | | | | |
| A1 Ref. (OHN 56) | | | | | | | | | |
| A1 (OHN 110) | 20 | 15 | 19 | 14 | 12 | 10 | 8 | 6 | 5 |
| A2 (OHN 48) | | 5 | | 5 | 7 | 9 | 11 | 13 | 14 |
| A3 (OHN 770) | 4 | 4 | 5 | 5 | 5 | 5 | 5 | 5 | 5 |
| A4 (OHN 550) | | | | | | | | | |
| Molecular sieve | 1 | 1 | 1 | 1 | 1 | 1 | 1 | 1 | 1 |
| K2 | | | | | | | | | |
| B1-1 VL | 14.80 | 13.92 | 16.66 | 15.77 | 15.42 | 15.08 | 14.73 | 14.38 | 14.21 |
| B1-2 CD | | | | | | | | | |
| GT [min] | 6' | 2' | 3' | 3' | 3' | 3' | 3' | 2' | 1' |
| 1st TG [° C.] | — | −57 | — | −58 | −56 | −58 | −55 | −52 | −49 |
| 2nd TG [° C.] | 100 | 115 | 118 | 136 | 139 | 151 | 152 | 160 | 168 |
| TS [MPa] | 17.2 | 17.3 | 22.2 | 20.1 | 20 | 20.7 | 18.7 | 11.1 | 7.16 |
| EB [%] | 64.9 | 71.4 | 63.6 | 51.7 | 44.6 | 69.5 | 18.5 | 15.2 | 40 |
| Mod. E. 1 [MPa] | 451 | 498 | 749 | 690 | 704.33 | 726 | 740 | 422 | 61.6 |
| Mod. E. 2 [MPa] | 233.41 | 256.49 | 385.79 | 350.78 | 362.06 | 381.59 | 341.67 | 161.38 | 34.73 |
| A1/(A2 + A3 + A4) | 0.71 | 0.50 | 0.54 | 0.38 | 0.32 | 0.26 | 0.20 | 0.15 | 0.12 |
| (A1 + A2)/(A3 + A4) | 0.71 | 0.61 | 0.54 | 0.46 | 0.43 | 0.40 | 0.37 | 0.33 | 0.32 |
| (A1 + A2)/(A3) | 0.71 | 0.61 | 0.54 | 0.46 | 0.43 | 0.40 | 0.37 | 0.33 | 0.32 |
| (A1 + A2)/(A4) | — | — | — | — | — | — | — | — | — |
| A1/A2 | — | 6.88 | — | 6.42 | 3.93 | 2.55 | 1.67 | 1.06 | 0.82 |
| A1/A3 | 0.71 | 0.54 | 0.54 | 0.40 | 0.34 | 0.29 | 0.23 | 0.17 | 0.14 |
| Diff.Tg1 + Tg2 | — | 172 | — | 194 | 195 | 209 | 207 | 212 | 217 |

TABLE 3

|  | Ref. 9 | Ref. 10 | Ref.11 | Ref. 12 | Ref. 13 | Ref. 14 | Ref. 15 | Ref. 16 | Ref. 17 |
|---|---|---|---|---|---|---|---|---|---|
| K1 | | | | | | | | | |
| A1 Ref. (OHN 56) | | | | | | | | | |
| A1 (OHN 110) | 20 | 15 | 19 | 14 | 12 | 10 | 8 | 6 | 5 |
| A2 (OHN 48) | | 5 | | 5 | 7 | 9 | 11 | 13 | 14 |
| A3 (OHN 770) | | | | | | | | | |
| A4 (OHN 550) | 4 | 4 | 5 | 5 | 5 | 5 | 5 | 5 | 5 |
| Molecular sieve | 1 | 1 | 1 | 1 | 1 | 1 | 1 | 1 | 1 |
| K2 | | | | | | | | | |
| B1-1 VL | 11.50 | 10.69 | 12.65 | 11.84 | 11.52 | 11.20 | 10.90 | 10.55 | 10.39 |
| B1-2 CD | | | | | | | | | |
| GT [min] | >120 | >120 | >120 | >120 | >120 | >120 | >120 | >120 | >120 |
| 1st TG [° C.] | — | −56 | −52 | −45 | −50 | −53 | −41 | −50 | −52 |
| 2nd TG [° C.] | 56 | 66 | 75 | 76 | 83 | 72 | 77 | 74 | 75 |

TABLE 3-continued

|  | Ref. 9 | Ref. 10 | Ref.11 | Ref. 12 | Ref. 13 | Ref. 14 | Ref. 15 | Ref. 16 | Ref. 17 |
|---|---|---|---|---|---|---|---|---|---|
| TS [MPa] | 6.59 | 12.4 | 10.9 | 12.8 | 13.6 | 12.1 | 8.7 | 6.7 | 6.7 |
| EB [%] | 83 | 135 | 83 | 113 | 113 | 118 | 67 | 59 | 59 |
| Mod. E. 1 [MPa] | 25.2 | 129 | 172 | 190 | 396 | 192 | 267 | 328 | 184 |
| Mod. E. 2 [MPa] | 20.3 | 43.7 | 74.7 | 95.9 | 117.7 | 95.8 | 94.5 | 60.4 | 56.5 |
| A1/(A2 + A3 + A4) | 0.71 | 0.50 | 0.54 | 0.38 | 0.32 | 0.26 | 0.20 | 0.15 | 0.12 |
| (A1 + A2)/(A3 + A4) | 0.71 | 0.61 | 0.54 | 0.46 | 0.43 | 0.40 | 0.37 | 0.33 | 0.32 |
| (A1 + A2)/(A3) | — | — | — | — | — | — | — | — | — |
| (A1 + A2)/(A4) | 0.71 | 0.61 | 0.54 | 0.46 | 0.43 | 0.40 | 0.37 | 0.33 | 0.32 |
| A1/A2 | — | 6.88 | — | 6.42 | 3.93 | 2.55 | 1.67 | 1.06 | 0.82 |
| A1/A3 | — | — | — | — | — | — | — | — | — |
| Diff.Tg1 + Tg2 | — | 122 | 127 | 121 | 133 | 125 | 118 | 124 | 127 |

TABLE 4

|  | Ref. 18 | Ref. 19 | Ref.20 | Ref.21 | Ref.22 | Ref.23 | Ref.24 | Ref.25 | Ref.26 |
|---|---|---|---|---|---|---|---|---|---|
| K1 |  |  |  |  |  |  |  |  |  |
| A1 Ref. (OHN 56) |  |  |  |  |  |  |  |  |  |
| A1 (OHN 110) | 20 | 15 | 19 | 14 | 12 | 10 | 8 | 6 | 5 |
| A2 (OHN 48) |  | 5 |  | 5 | 7 | 9 | 11 | 13 | 14 |
| A3 (OHN 770) |  |  |  |  |  |  |  |  |  |
| A4 (OHN 550) | 4 | 4 | 5 | 5 | 5 | 5 | 5 | 5 | 5 |
| Molecular sieve | 1 | 1 | 1 | 1 | 1 | 1 | 1 | 1 | 1 |
| K2 |  |  |  |  |  |  |  |  |  |
| B1-1 VL | 12.33 | 11.46 | 13.56 | 12.69 | 12.34 | 12.00 | 11.65 | 11.30 | 11.13 |
| B1-2 CD |  |  |  |  |  |  |  |  |  |
| GT [min] | >120 | >120 | >120 | >120 | >120 | >120 | >120 | >120 | >120 |
| 1st TG [° C.] | 14 | −42 | 5 | −55 | −55 | −42 | −58 | −52 | −52 |
| 2nd TG [° C.] | 66 | 70 | 74 | 77 | 80 | 88 | 82 | 84 | 90 |
| TS [MPa] | 13.1 | 16.6 | 14.3 | 18.1 | 18.9 | 16.6 | 17.1 | 10.9 | 8.8 |
| EB [%] | 116.6 | 147.1 | 89 | 135.1 | 150.8 | 134.9 | 148 | 74.2 | 37 |
| Mod. E. 1 [MPa] | 218 | 286 | 382 | 471 | 427 | 503 | 463 | 440 | 214 |
| Mod. E. 2 [MPa] | 84.9 | 107.7 | 162.6 | 190.4 | 191.6 | 199.3 | 174.9 | 137.7 | 104 |
| A1/(A2 + A3 + A4) | 0.71 | 0.50 | 0.54 | 0.38 | 0.32 | 0.26 | 0.20 | 0.15 | 0.12 |
| (A1 + A2)/(A3 + A4) | 0.71 | 0.61 | 0.54 | 0.46 | 0.43 | 0.40 | 0.37 | 0.33 | 0.32 |
| (A1 + A2)/(A3) | — | — | — | — | — | — | — | — | — |
| (A1 + A2)/(A4) | 0.71 | 0.61 | 0.54 | 0.46 | 0.43 | 0.40 | 0.37 | 0.33 | 0.32 |
| A1/A2 | — | 6.88 | — | 6.42 | 3.93 | 2.55 | 1.67 | 1.06 | 0.82 |
| A1/A3 | — | — | — | — | — | — | — | — | — |
| Diff.Tg1 + Tg2 |  |  |  |  |  |  |  |  |  |

TABLE 5

|  | Ref.27 | E13 | Ref.28 | E14 | E15 | E16 | E17 | E18 | Ref.29 |
|---|---|---|---|---|---|---|---|---|---|
| K1 |  |  |  |  |  |  |  |  |  |
| A1 Ref. (OHN 56) |  |  |  |  |  |  |  |  |  |
| A1 (OHN 110) | 20 | 15 | 19 | 14 | 12 | 10 | 8 | 6 | 5 |
| A2 (OHN 48) |  | 5 |  | 5 | 7 | 9 | 11 | 13 | 14 |
| A3 (OHN 770) | 1.6 | 1.6 | 2 | 2 | 2 | 2 | 2 | 2 | 2 |
| A4 (OHN 550) | 2.4 | 2.4 | 3 | 3 | 3 | 3 | 3 | 3 | 3 |
| Molecular sieve |  |  |  |  |  |  |  |  |  |
| K2 |  |  |  |  |  |  |  |  |  |
| B1-1 VL | 12.42 | 11.61 | 13.81 | 12.99 | 12.67 | 12.35 | 12.02 | 11.70 | 11.54 |
| B1-2 CD |  |  |  |  |  |  |  |  |  |
| GT [min] | 44' | 35' | 25' | 22' | 19' | 17' | 13' | 11' | 9' |
| 1st TG [° C.] | — | 0 | 10 | −55 | −55 | −50 | −40 | −53 | −40 |
| 2nd TG [° C.] | 71 | 80 | 89 | 84 | 89 | 96 | 105 | 119 | 130 |
| TS [MPa] | 12.6 | 13.7 | 17.17 | 18 | 18.2 | 17.7 | 14.47 | 10.5 | 5.8 |
| EB [%] | 79.8 | 93 | 80.46 | 93.7 | 85.5 | 74.27 | 56.9 | 35.3 | 20.35 |
| Mod. E. 1 [MPa] | 183 | 197 | 306 | 295 | 368 | 508 | 410 | 301 | 229 |
| Mod. E. 2 [MPa] | 71.63 | 79.08 | 145.35 | 149.06 | 171.18 | 182.83 | 179.8 | 141.79 | 78.59 |
| A1/(A2 + A3 + A4) | 0.86 | 0.59 | 0.66 | 0.45 | 0.37 | 0.30 | 0.24 | 0.17 | 0.14 |
| (A1 + A2)/(A3 + A4) | 0.86 | 0.74 | 0.66 | 0.56 | 0.52 | 0.48 | 0.44 | 0.40 | 0.38 |
| (A1 + A2)/(A3) | 1.79 | 1.53 | 1.36 | 1.16 | 1.08 | 0.99 | 0.91 | 0.83 | 0.79 |

TABLE 5-continued

|  | Ref.27 | E13 | Ref.28 | E14 | E15 | E16 | E17 | E18 | Ref.29 |
|---|---|---|---|---|---|---|---|---|---|
| (A1 + A2)/(A4) | 1.67 | 1.43 | 1.27 | 1.08 | 1.00 | 0.93 | 0.85 | 0.78 | 0.74 |
| A1/A2 | — | 6.88 | — | 6.42 | 3.93 | 2.55 | 1.67 | 1.06 | 0.82 |
| A1/A3 | 1.79 | 1.34 | 1.36 | 1.00 | 0.86 | 0.71 | 0.57 | 0.43 | 0.36 |
| Diff.Tg1 + Tg2 | — | 80 | 79 | 139 | 144 | 146 | 145 | 172 | 170 |

TABLE 6

|  | Ref.30 | E19 | Ref.31 | E20 | E21 | E22 | E23 | E24 | Ref.32 |
|---|---|---|---|---|---|---|---|---|---|
| K1 | | | | | | | | | |
| A1 Ref. (OHN 56) | | | | | | | | | |
| A1 (OHN 110) | 20 | 15 | 19 | 14 | 12 | 10 | 8 | 6 | 5 |
| A2 (OHN 48) | | 5 | | 5 | 7 | 9 | 11 | 13 | 14 |
| A3 (OHN 770) | 1.6 | 1.6 | 2 | 2 | 2 | 2 | 2 | 2 | 2 |
| A4 (OHN 550) | 2.4 | 2.4 | 3 | 3 | 3 | 3 | 3 | 3 | 3 |
| Molecular sieve | 1 | 1 | 1 | 1 | 1 | 1 | 1 | 1 | 1 |
| K2 | | | | | | | | | |
| B1-1 VL | | | | | | | | | |
| B1-2 CD | 13.31 | 12.44 | 14.79 | 13.92 | 13.58 | 13.23 | 12.88 | 12.53 | 12.35 |
| GT [min] | 75' | 60' | 53' | 35' | 25' | 17' | 15' | 13' | 12' |
| 1st TG [° C.] | — | −44 | — | −44 | −47 | −47 | −40 | −58 | −50 |
| 2nd TG [° C.] | 78 | 84 | 87 | 97 | 97 | 104 | 112 | 124 | 132 |
| TS [MPa] | 15.8 | 16.7 | 18.7 | 19.6 | 18.35 | 18.6 | 17.8 | 13 | 9.53 |
| EB [%] | 94.9 | 100.4 | 81.3 | 101.9 | 100.15 | 94.4 | 96.35 | 32.3 | 30.1 |
| Mod. E. 1 [MPa] | 316 | 346 | 494 | 530 | 537 | 516 | 488 | 483 | 288 |
| Mod. E. 2 [MPa] | 144.27 | 172.37 | 257.36 | 259.09 | 252.3 | 263.27 | 261.33 | 229.35 | 135.88 |
| A1/(A2 + A3 + A4) | 0.86 | 0.59 | 0.66 | 0.45 | 0.37 | 0.30 | 0.24 | 0.17 | 0.14 |
| (A1 + A2)/(A3 + A4) | 0.86 | 0.74 | 0.66 | 0.56 | 0.52 | 0.48 | 0.44 | 0.40 | 0.38 |
| (A1 + A2)/(A3) | 1.79 | 1.53 | 1.36 | 1.16 | 1.08 | 0.99 | 0.91 | 0.83 | 0.79 |
| (A1 + A2)/(A4) | 1.67 | 1.43 | 1.27 | 1.08 | 1.00 | 0.93 | 0.85 | 0.78 | 0.74 |
| A1/A2 | — | 6.88 | — | 6.42 | 3.93 | 2.55 | 1.67 | 1.06 | 0.82 |
| A1/A3 | 1.79 | 1.34 | 1.36 | 1.00 | 0.86 | 0.71 | 0.57 | 0.43 | 0.36 |
| Diff.Tg1 + Tg2 | — | 128 | — | 141 | 144 | 151 | 152 | 182 | 182 |

TABLE 7

|  | Ref. 7 | E9 | Ref.22 | Ref.31 | E21 | Ref.2 | E1 | Ref.4 | E3 | Ref. 5 | Ref. 13 | Ref.28 | E15 |
|---|---|---|---|---|---|---|---|---|---|---|---|---|---|
| K1 | | | | | | | | | | | | | |
| A1 Ref. (OHN 56) | | | | | | 15 | | | | | | | |
| A1 (OHN 110) | 19 | 12 | 12 | 19 | 12 | | 15 | 19 | 12 | 5 | 12 | 19 | 12 |
| A2 (OHN 48) | | 7 | 7 | | 7 | 5 | 5 | | 7 | 14 | 7 | | 7 |
| A3 (OHN 770) | 5 | 5 | | 2 | 2 | 4 | 4 | 5 | 5 | 5 | | 2 | 2 |
| A4 (OHN 550) | | | 5 | 3 | 3 | | | | | | 5 | 3 | 3 |
| Molecular sieve | 1 | 1 | 1 | 1 | 1 | 1 | 1 | 1 | 1 | 1 | 1 | 1 | 1 |
| K2 | | | | | | | | | | | | | |
| B1-1 VL | | | | | | 10.90 | 13.00 | 15.53 | 14.39 | 13.26 | 11.52 | 13.81 | 12.67 |
| B1-2 CD | 16.66 | 15.42 | 12.34 | 14.79 | 13.58 | | | | | | | | |
| LSS RT [MPa] | 10.2 | 13.9 | 11.7 | 11.6 | 12.5 | 6.0 | 12.6 | 12.0 | 13.1 | 5.6 | 9.7 | 11.2 | 11.6 |
| LSS 80° C. [MPa] | 5.2 | 5.5 | 1.6 | 3.5 | 5.2 | 3.5 | 6.8 | 5.2 | 6.2 | 3.3 | 1.4 | 3.4 | 5.3 |

Tables 1-7 specify the components of the polyol comp. K1, or of the polyisocyanate comp. K2, in parts by weight. The figures A1/(A2+A3+A4), (A1+A2)/(A3+A4), (A1+A2)/(A3), (A1+A2)/(A4), A1/A2 and A1/A3 relate to the molar ratio of the OH groups.

"Gelation Time (GT) [min]" as a measure of open time was determined the pot life in a beaker. For this purpose, 20 g of the polyol comp. K1 was mixed with the appropriate amount of polyisocyanate comp. K2 for 30 seconds, and the time of occurrence of gelation was determined, i.e. when a thread of the mixed composition on a metal spatula of length 15 cm (spatula scoop 30×10 mm length/width) broke in the course of stirring.

E1 to E24 are inventive examples. Ref.1 to Ref.32 are comparative examples.

The invention claimed is:

1. A two-component polyurethane composition consisting of a polyol component K1 and a polyisocyanate component K2;

wherein the polyol component K1 comprises
at least one polyester polyol A1 based on dimer fatty acids and/or dimer fatty alcohols having an OH number of 65-350 mg KOH/g; and
at least one polybutadiene polyol having an OH functionality in the range of 2.1-2.9 and an OH number of 40-100 mg KOH/g A2; and
at least one alkoxylated alkylenediamine having an OH number of 350-950 mg KOH/g A3;
and wherein the polyisocyanate component K2 comprises
at least one aromatic polyisocyanate B1,
where the ratio of the OH groups of A1:A2 is 1:1-20:1.

2. The two-component polyurethane composition as claimed in claim 1, wherein the at least one polyester polyol A1 is a polyester polyol A1 based on dimer fatty acids derived from $C_{10}$-$C_{26}$ fatty acids.

3. The two-component polyurethane composition as claimed in claim 1, wherein it is an alkoxylated alkylenediamine having an OH number of 350-950 mg KOH/g A3 selected from the list consisting of N,N,N',N'-tetrakis(2-hydroxyethyl)ethylenediamine and N,N,N',N'-tetrakis(2-hydroxypropyl)ethylenediamine.

4. The two-component polyurethane composition as claimed in claim 1, wherein the polyol component K1 additionally includes at least one aliphatic triol A4, where the aliphatic triol A4 is:
propane-1,2,3-triol and/or
1,1,1-trimethylolpropane and/or
polyether polyols based on 1,1,1-trimethylolpropane having a molecular weight of 170-500 g/mol and an OH number of 400-1100 mg KOH/g.

5. The two-component polyurethane composition as claimed in claim 1, wherein the ratio of the OH groups of A1:A2 is 1:1-8:1.

6. The two-component polyurethane composition as claimed in claim 1, wherein
the polyol component K1 optionally includes at least one aliphatic triol A4, where the aliphatic triol A4 is:
propane-1,2,3-triol and/or
1,1,1-trimethylolpropane and/or
polyether polyols based on 1,1,1-trimethylolpropane having a molecular weight of 170-500 g/mol and an OH number of 400-1100 mg KOH/g, and
the ratio of the OH groups of (A1+A2):(A3+A4) is less than or equal to 0.6:1.

7. The two-component polyurethane composition as claimed in claim 1, wherein the ratio of all NCO groups of the aromatic polyisocyanates B1:all OH groups of the polyol component K1=0.9:1-1.2:1.

8. The two-component polyurethane composition as claimed in claim 1, wherein the aromatic polyisocyanate B1 is monomeric MDI or oligomers, polymers and derivatives derived from MDI.

9. The two-component polyurethane composition as claimed in claim 1, wherein
the polyol component K1 optionally includes at least one aliphatic triol A4, where the aliphatic triol A4 is:
propane-1,2,3-triol and/or
1,1,1-trimethylolpropane and/or
polyether polyols based on 1,1,1-trimethylolpropane having a molecular weight of 170-500 g/mol and an OH number of 400-1100 mg KOH/g, and
the sum total of all OH groups of (A1+A2+A3A4) is ≥80% of the sum total of all OH groups of the two-component polyurethane composition.

10. A method of bonding a first substrate to a second substrate, comprising the steps of
mixing the polyol component K1 and the polyisocyanate component K2 of the two-component polyurethane composition as claimed in claim 1,
applying the mixed polyurethane composition to at least one of the substrate surfaces to be bonded,
joining the substrates to be bonded within the open time,
curing the polyurethane composition.

11. A bonded article obtained from a method as claimed in claim 10.

12. A structural adhesive that bonds two substrates formed by using the two-component polyurethane composition as claimed in 1.

13. A method of filling joins and gaps in a substrate, comprising the steps of
a) mixing the polyol component K1 and the polyisocyanate component K2 of the two-component polyurethane composition as claimed in claim 1,
b) applying the mixed polyurethane composition to the gap or join to be filled in the substrate,
c) curing the polyurethane composition in the join or gap.

14. An article obtained from the method as claimed in claim 13.

15. An infusion resin formed by using the two-component polyurethane composition as claimed in 1.

* * * * *